(12) United States Patent
Diamond

(10) Patent No.: US 7,542,928 B2
(45) Date of Patent: Jun. 2, 2009

(54) FOR FEE DISTRIBUTION OF CONSUMER SELECTED CONTENT ITEMS BETWEEN DIFFERENT SATELLITE RADIO SERVICE PROVIDERS

(75) Inventor: Paul Diamond, Fort Lee, NJ (US)

(73) Assignee: Consumer Satellite Radio, LLC, Fort Lee, NJ (US)

( * ) Notice: Subject to any disclaimer, the term of this patent is extended or adjusted under 35 U.S.C. 154(b) by 0 days.

(21) Appl. No.: 12/187,874

(22) Filed: Aug. 7, 2008

(65) Prior Publication Data

US 2009/0083163 A1 Mar. 26, 2009

Related U.S. Application Data

(63) Continuation of application No. 11/120,848, filed on May 3, 2005, now Pat. No. 7,436,792.

(60) Provisional application No. 60/641,234, filed on Jan. 3, 2005.

(51) Int. Cl.
*G06Q 30/00* (2006.01)
*H04B 7/185* (2006.01)
*H04W 40/00* (2009.01)
*G01S 15/74* (2006.01)
*G01S 3/02* (2006.01)

(52) U.S. Cl. ............... 705/26; 455/428; 455/12.1; 342/465; 342/46

(58) Field of Classification Search ............... 370/316; 455/2.01, 3.02, 428, 12.1; 725/31, 86, 87; 705/26; 742/465, 352, 46
See application file for complete search history.

(56) References Cited

U.S. PATENT DOCUMENTS

| 5,708,963 | A | 1/1998 | Mobley et al. |
| 6,775,778 | B1 | 8/2004 | Lackzo et al. |
| 7,134,131 | B1 * | 11/2006 | Hendricks et al. ............ 725/31 |
| 2002/0132575 | A1 * | 9/2002 | Kesling et al. ............ 455/2.01 |
| 2003/0185164 | A1 * | 10/2003 | Marko et al. ............ 370/316 |
| 2005/0198673 | A1 | 9/2005 | Kit et al. |

* cited by examiner

*Primary Examiner*—Charles N Appiah
*Assistant Examiner*—Kiet Doan

(57) ABSTRACT

According to the invention, a subscriber to a first satellite radio service can be provided with an option to receive, over their current receiver unit, supplemental content, such as a particular show or channel, which is otherwise only available within a relevant jurisdiction as part of a subscription package to subscribers of one or more other satellite radio services. Thus, without purchasing a full subscription to another service, the subscriber of the first satellite radio service may arrange to receive supplemental content that is otherwise only available as part of a subscription package, such as a basic or general subscription package, to subscription holders of one or more other services. The invention also provides methods of broadcasting and methods of configuring dedicated and interoperable satellite radio receiver units so that the supplemental content can be received by a subscriber.

5 Claims, 1 Drawing Sheet

FOR FEE DISTRIBUTION OF CONSUMER SELECTED CONTENT ITEMS BETWEEN DIFFERENT SATELLITE RADIO SERVICE PROVIDERS

This application is a continuation of U.S. patent application Ser. No. 11/120,848 filed May 3, 2005 (now U.S. Pat. No. 7,436,792 B1), which claims the benefit of U.S. provisional patent application Ser. No. 60/641,234 filed Jan. 3, 2005, each of which is hereby incorporated by reference in its entirety.

FIELD OF THE INVENTION

The invention relates generally to the field of satellite digital audio radio broadcasting.

BACKGROUND

Consumer satellite digital audio radio service providers include, in the United States of America (U.S.), XM Radio and Sirius Satellite Radio. The XM Radio and Sirius digital radio broadcast systems utilize different radio spectrum allocations. Specifically, XM Radio utilizes the 2,332.5 to 2,345 MHz range and Sirius utilizes the 2,320 to 2,332.5 MHz range. Further, the configuration of broadcast satellites and ground repeating stations, as well as the data encoding of signals, differs between the two services. There are two types of receiver units used by consumers. Dedicated receiver units are only capable of receiving, in the U.S., one of the two services and were introduced first. Interoperable receiver units are capable of receiving broadcasts of either of the two services. In the U.S., the Federal Communication Commission (FCC) has mandated that the interoperability of receivers between the XM Radio and Sirius systems be adopted as a standard. The concept and implementation of dedicated and interoperable satellite radio receiver units can also be generalized for any jurisdiction or area in which at least two satellite radio service providers operate.

XM Radio and Sirius each provide a subscription-based service whereby subscribers receive a package of various channels and broadcasts (shows). Although some content may overlap between XM Radio and Sirius, each is characterized by content that is exclusively available from its satellite radio subscription service with respect to U.S. satellite radio broadcasting. For example, the syndicated radio show "Coast to Coast AM" is only satellite broadcast to subscribers of XM Radio. Similarly, it has been reported that "The Howard Stern Radio Program" will be exclusively available to subscribers of the Sirius service. The total audience for each of these programs numbers in the millions.

SUMMARY OF THE INVENTION

In view of the above, subscribers to one satellite radio service, such as XM Radio or Sirius, have been deprived of receiving, by satellite, particular exclusive content of one or more other satellite radio services, which they may desire to receive. As a result, advertisers for particular programs have also been deprived of a segment of potential satellite listener audience and those holding rights to the content may also have been deprived of further advertising revenue. Prior to the instant invention, to receive the exclusive subscription content of more than one satellite radio service, for a given area or jurisdiction served, a person had to fully subscribe to more than one such service.

One aspect of the invention provides a method for providing supplemental satellite radio content that include the steps of: receiving an order from a new or preexisting subscriber to a first satellite service for at least one supplemental content item (such as a program or a channel, etc.) that is not available as part of a subscription, such as a basic or general subscription, to subscribers of the first satellite service, but which is available on a subscription package basis, for example, as part of a basic subscription package, to subscribers of at least one other satellite service that serves at least part of the area served by the first satellite service the subscriber being associated with a receiver unit over which the subscriber receives access to the subscription content of the first satellite service provider; and in response to the order, providing the supplemental content item via the receiver unit.

Another aspect of the invention provides a method for obtaining supplemental satellite radio content, that include the steps of: ordering at least one selected supplemental content that is not available as part of a new or existing subscription package to a first satellite service by which subscription package content is received, but which is available as part of a subscription package to subscribers of at least one other satellite service that serves at least part of the area served by the first satellite service; and in response to the order, receiving access to the supplemental content item on a receiver unit on which the subscription content of the first satellite service is received.

A further aspect of the invention provides a method for providing supplemental content items to a satellite radio service subscriber, that includes the step of configuring a satellite digital audio receiver unit associated with a subscription package of a first satellite radio service (for a new or preexisting subscription) so that it receives: (i.) subscription content of the subscription package of the first satellite radio service; and (ii.) at least one supplemental content item that is not available as part of a subscription package to the first satellite radio service, but which is available as part of a subscription package, for example, a basic or general subscription package, to a second satellite radio service that serves at least part, for example, at least a substantial part, of the area served by the first satellite radio service provider.

DETAILED DESCRIPTION

Figure 1:
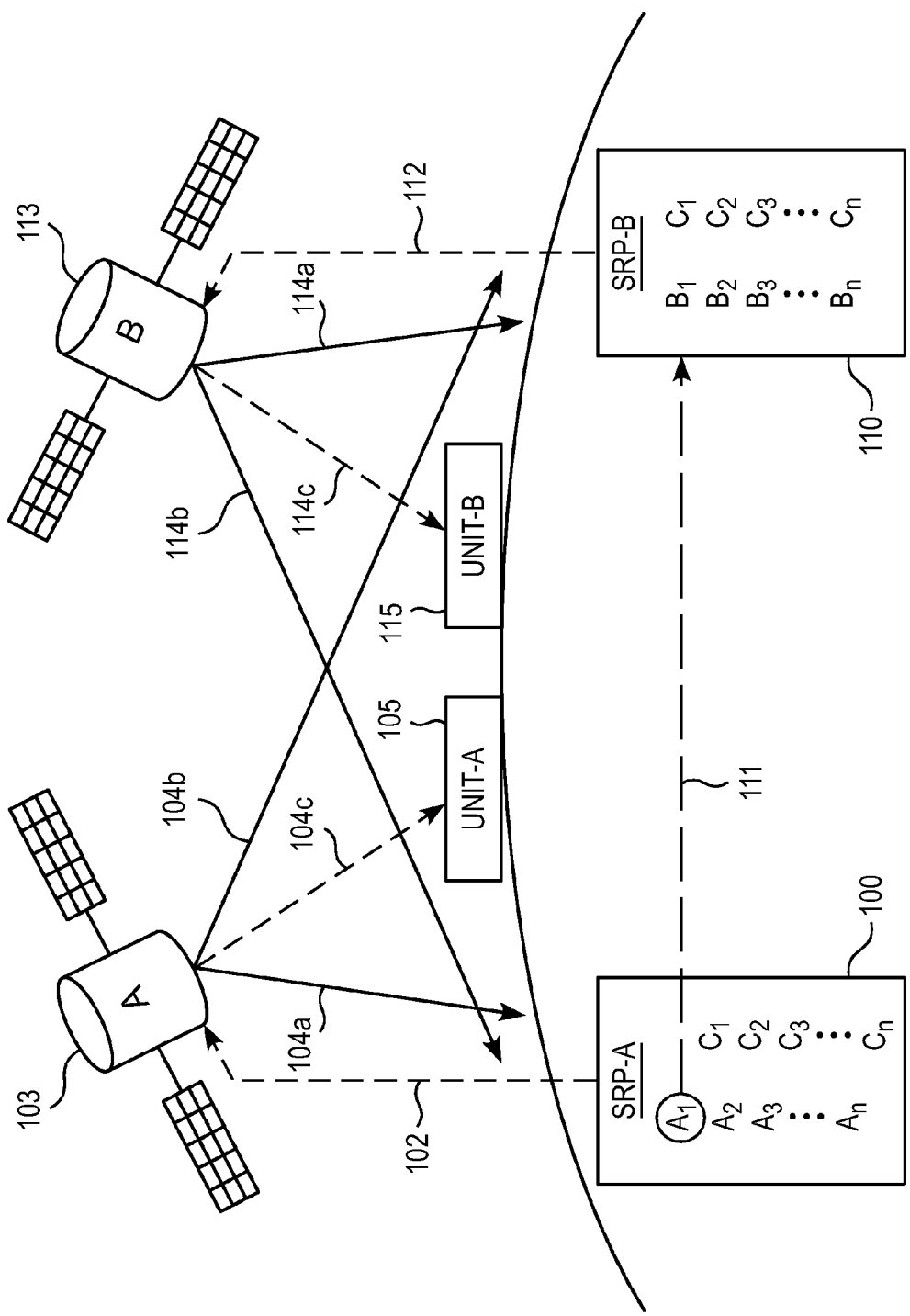
FIG. 1 illustrates an embodiment of the invention in which an exclusive content item associated with a subscription to a first satellite radio service provider is provided as a supplemental content item that may be ordered by subscribers to a second satellite radio service provider.

According to the invention, a subscriber to a first satellite radio service can be provided with an option to receive, over their current receiver system, particular content (such as a particular show or channel) that is otherwise only available, within a relevant jurisdiction, as part of a subscription package to subscribers of a second or still other satellite radio service. Thus, the subscriber to the first satellite radio service may arrange to receive desired, supplemental content, for example, on an "a la carte" basis, which is otherwise only available as part of a subscription package, such as a basic or general subscription package, to subscription holders of at least one other service.

FIG. 1 shows the operation of an embodiment of the invention in which exclusive content items associated with a subscription to a first satellite radio service provider are provided as supplemental content items that may be ordered by subscribers to a second satellite radio service provider. A first satellite radio provider (SRP-A) has a content catalog 100 that is associated with a subscription to SRP-A and includes exclusive content items $A_1$ through $A_n$, and non-exclusive (common) content items $C_1$ through $C_n$, which are uplinked 102 to a transmission satellite 103 of the SRP-A and then transmitted to cover a span defined by 104a and 104b, which includes 104c which indicates the transmission being received by a receiver unit (Unit-A) 105 that is associated with a subscription holder of SRP-A. As shown in the FIGURE, in this example, receiver unit 105 only receives content from the SRP-A content catalog that is associated with a subscription to SRP-A. A second satellite radio provider (SRP-B) has a content catalog 110 that is associated with a subscription to SRP-B and includes exclusive content items $B_1$ through $B_n$ and non-exclusive content items $C_1$ through $C_n$, ($C_1$ through $C_n$, being the same as for SRP-A) which are uplinked 112 to a transmission satellite 113 of the SRP-B and then transmitted to over a span defined by 114a and 114b, which includes 114c which indicates the transmission being received by a receiver unit (Unit-B) 115 that is associated with a subscription holder of SRP-B. It can be seen from the FIGURE that the services of SRP-A and SRP-B are overlapping, with receiver units 105 and 115 each being within the overlapping area. According to this embodiment of the invention, the subscription holder of SRP-B associated with receiver unit 115 (Unit-B) has ordered as a supplemental content item (e.g., a show or channel) to be received by receiver unit 115 (Unit-B) over the SRP-B transmission system exclusive content item $A_1$ of the SRP-A subscription content catalog, and pursuant to said order receives content $A_1$ as described, in addition to the regular SRP-B content catalog. Arrow 111 indicates the transfer of content item $A_1$ from SRP-A to SRP-B so that it may be broadcast to SRP-B subscribers who have ordered it as a content item supplemental to their SRP-B satellite radio subscription.

An extra fee may be charged to the subscriber for the supplemental content. Optionally, the extra fee can be billed through the first service provider along with the billing for the regular subscription to the first service. In one embodiment, part of the fees paid for supplemental programs of another service is apportioned to the service for which the general subscription is held (by the subscriber who orders the supplemental service) and part is apportioned to the service(s) that offers the content on a general subscription basis (i.e., as part of a multi-content, multi-channel subscription package) to its own subscribers. Part of the extra fee may also be apportioned to other parties having rights in connection with the supplemental content. In this manner a "win-win" situation comprising extra revenue generation for all involved satellite radio service providers can be manifested.

Another advantage of the invention is that it allows the satellite radio service provider that offers the content as part of a basic or general subscription package to continue to market itself as the exclusive provider of that content as part of a basic or general subscription plan, while continuing to make that content available to subscribers of other satellite service providers in a manner that generates additional revenue for each of the involved satellite radio service providers.

In one embodiment, satellite radio content that is ordinarily only available as part of a subscription to subscribers to a first satellite radio service is offered on a supplementary basis to subscribers of a second satellite radio service, over the broadcast system of the second satellite radio service. The supplemental content can be provided to or picked up by the subscriber's service provider by any means and then broadcast over the subscriber's service provider's satellite broadcast system. When a subscriber orders a supplemental program, as described, the system of the subscriber's satellite service provider, including the subscriber's receiver if necessary, will be configured to permit the supplemental programs to be played by the subscriber. This can be performed in any manner. For example, the supplemental content can be broadcast over the subscriber's provider's system in an encrypted form and the receiver of a subscriber who orders the supplemental content can be provided with or otherwise enabled with one or more keys and/or algorithms necessary to decrypt the encrypted supplemental content. In this manner, access to the supplemental content can be limited to authorized subscribers, i.e., those who have legitimately ordered the supplemental content.

In another embodiment, at least one satellite radio content item that is ordinarily only available as part of a subscription to subscribers to a first satellite radio service is provided on a supplementary basis to subscribers of a second satellite radio service, at their option, via a single interoperable satellite radio receiver unit, the supplemental content being received over the broadcast system of the first satellite radio service and the subscription content of the second satellite radio service being received over the broadcast system of the second satellite radio service.

A satellite digital audio radio system (SDARS) receiver unit includes an antenna or is connected to an antenna for receiving the broadcasts of one or more satellite radio broadcasts systems, either directly from a satellite or from a terrestrial repeating station. A receiver unit also includes integrated circuits, for example, in the form of an integrated circuit chip set, for decrypting, decompressing and/or otherwise processing the broadcast, and for controlling other functions of the receiver unit. The integrated circuits generally include at least one processor. The receiver unit may further include permanent memory and/or rewritable memory. Thus, to the extent desired, it is within the skill of the art to provide an SDARS receiver unit that is programmable to carry out various functions. The integrated circuits may, for example, also include a hardware-based cryptographic key (or partial key) in permanent memory that is used alone or in conjunction with another key and at least one algorithm to decrypt encrypted information in a satellite radio signal. A unique identifier of the particular receiver unit, which is the same as the key (or partial key) or which is separate from the key (or partial key) can also be provided in the memory of the receiver unit. The integrated circuit system of an SDARS receiver unit may also be configured to receive information and/or instructions broadcast over the satellite broadcast system itself and to store the information and/or perform the instructions. By virtue of the unique identifier, information and instructions can be selectively provided over the satellite broadcast system to a particular receiver unit.

Those skilled in the art will recognize that there are many ways to control, with varying degrees of security, the dissemination of satellite radio content, including supplemental satellite radio content provided according to the invention, so that only authorized parties can play the broadcasts that they are entitled to receive using their SDARS receiver units.

In one method, a receiver unit is configured to receive instructions from a satellite broadcast system to only play content, including subscription package content and/or supplemental content, which the particular SDARS receiver unit is authorized to receive. Since each channel and broadcast (program) can be uniquely identified and distinguished from the next, an SDARS unit can be programmed to play only that content which is authorized for the particular unit, irrespective of encryption.

In another method, a receiver unit is provided with the necessary key(s) and/or algorithm(s) to decrypt the encrypted signal of each broadcast that a party has been authorized to receive. For example, a first key (or first set of keys) may be required and sufficient to receive a basic subscription to a satellite broadcast service and a separate second key (or second set of keys) may be required and sufficient when provided to the receiver unit to receive one or more supplemental content items that the subscriber purchased in addition to their subscription package. Thus, in order to restrict content to only authorized parties, a register of appropriate keys and/or algorithms can be provided to a particular receiver unit and stored in its memory along with any necessary instructions.

In another method, nested encryption is used. For example, in the case where the supplemental content is broadcast over the same satellite broadcast system for which a basic or general subscription is held, a supplemental content item is first encrypted, for example, using a computationally fast cryptographic technique, for example, using a symmetrical key algorithm, such as those known in the art. The subscription package content and the first-encrypted supplemental content item is encrypted or further encrypted, respectively, using the same encryption technique with the same key(s) and algorithm(s), the technique and/or the key(s) and/or the algorithm (s) being different than that employed in the first encryption of the supplemental content item(s). For example, a strong encryption technique, such as a public key encryption technique, for example, elliptic curve cryptography (ECC) or an RSA encryption algorithm technique can be used in this second-described encryption. A subscriber's receiver unit is provided with the necessary keys and/or algorithms required to decrypt the second-described encryption (i.e., the outer layer of encryption), which allows the subscription package content to be played by the receiver. When a subscriber orders supplemental content, the necessary additional key(s) and/or algorithm(s) required to decrypt the first level of encryption (i.e., the inner layer of encryption) for the ordered supplemental content item is provided to the subscriber's receiver unit so that authorized supplemental content can be played.

Accordingly, one embodiment of the invention provides a method for broadcasting subscription package satellite radio content and supplemental radio satellite content over a satellite radio broadcast system that includes the steps of: encrypting the supplemental satellite radio content with a first encryption; encrypting the subscription package satellite radio content and the first-encrypted supplemental radio satellite content with the same second encryption that is different than the first encryption; and broadcasting the subscription package satellite radio content encrypted with the second encryption and the supplemental satellite radio content encrypted with the first and second encryption over the satellite radio broadcast system. In one variation, the first encryption utilizes an encryption algorithm that allows a computationally faster and/or less computationally intensive decryption process than can the encryption algorithm employed in the second encryption.

One embodiment of the invention provides a method for providing supplemental satellite radio content that includes the steps of: receiving an order from a new or preexisting subscriber to a first satellite radio service for at least one selected supplemental content item (such as a show or a channel, etc.) that is not available as part of a subscription package, such as a basic or general subscription package, to subscribers of the first satellite service provider, but which is available on a subscription package basis, for example, as part of a basic or general subscription package, to subscribers of at least one other satellite service provider that serves at least part of the area, for example, at least substantially the same area, served by the first satellite service provider; and in response to the order, providing the supplemental content item to a receiver unit associated with the subscriber.

In one variation, the step of providing the supplemental content item includes providing the supplemental content item over the first satellite service's broadcast system to the receiver unit. In a subvariation, the receiver unit is a non-interoperable receiver unit with respect to the broadcast systems of the first and the second satellite services. In a different subvariation, the receiver unit is interoperable between the broadcast systems of the first and the second satellite services. In still another variation of the embodiment, the receiver unit is interoperable between the broadcast systems of the first and the second satellite services, subscription content of the first satellite service is provided over the first satellite service's broadcast system to the receiver unit, and the step of providing the supplemental content item to the receiver unit includes providing the item to the receiver unit over the second satellite service's broadcast system.

Another embodiment provides a method of doing business in connection with providing satellite radio content to consumers that includes the step of: offering to a new or preexisting subscriber of a first satellite radio service the option of receiving, on the same receiver unit used to receive (or to be used for receiving) the content associated with the subscription to the first satellite radio service, at least one supplemental content item (such as a show or a channel, etc.) that (i.) is not included in the content associated with the subscription to the first satellite radio service and/or (ii.) is at least not generally available as part of a subscription package, for example, not available as part of a basic or general subscription package, to the subscribers of the first service—but which is available on a subscription package basis, for example, as part of a basic or general subscription package, to subscribers of a second satellite radio service that serves at least part, for example, at least a substantial part, of the area served by the first satellite radio service. The step of offering may, for example, be made pursuant to forming an agreement that allows such offers to be made, the agreement being formed between at least a first satellite radio service provider that provides the first satellite radio service and a second satellite radio service provider that provides the second satellite radio service that serves at least part of the area served by the first satellite service.

Another embodiment provides a method for providing supplemental satellite radio content that includes the steps of: by agreement between at least a first satellite radio service provider providing a first satellite radio service and a second satellite radio service provider providing a second satellite radio service that serves at least part of the area served by the first satellite service, making at least one content-item (such as a show or a channel, etc.) that is available on a subscription package basis, for example, as part of a basic or general subscription package, to subscribers of the second satellite radio service but not available as part of a subscription package, such as a basic or general subscription package, to the subscribers of the first service, available to subscribers of the first service on a supplemental basis at their option; receiving an order from a new or preexisting subscriber to the first satellite radio service for at least one supplemental content item (such as a show or a channel, etc.) that is not available as part of a subscription package, for example, as part of a basic or general subscription package, to subscribers of the first satellite service, but which is available as part of a subscription package, such as a basic or general subscription package, to subscribers of the/a second satellite radio service that serves at least part of the area served by the first satellite service; and, in response to the order, providing access to the supplemental content item on a receiver unit associated with the subscriber. The step of providing access to the supplemental content item may, for example, include configuring the receiver unit so that it will play the supplemental content item.

In one variation of the embodiment, the step of providing the supplemental content item includes: providing the supplemental content item over the first satellite service's broadcast system to the receiver unit. In a subvariation, the receiver unit is a non-interoperable receiver unit with respect to the broadcast systems of the first and the second satellite service provider. In a different subvariation, the receiver unit is interoperable between the broadcast systems of the first and the second satellite services. In another variation of the embodiment, the receiver unit is interoperable between the broadcast systems of the first and the second satellite services, the subscription content of the first satellite service provider is provided over the first satellite service's broadcast system to the receiver unit, and the step of providing access to the supplemental content item on the receiver unit includes providing the item to the receiver unit via the second satellite service's broadcast system.

A further embodiment provides a method for providing supplemental satellite radio content that includes the steps of: forming an agreement between at least a first satellite radio service provider providing a first satellite radio service and a second satellite radio service provider providing a second satellite radio service that serves at least part of the area served by the first satellite service, wherein at least one content-item (such as a show or a channel, etc.) that is available as part of a subscription package, for example, as part of a basic or general subscription package, to subscribers of the second satellite radio service but not available as part of a subscription package, for example, as part of a basic or general subscription package, to the subscribers of the first service, is made available to subscribers of the first service on a supplemental basis at their option; receiving an order from a new or preexisting subscriber to the first satellite radio service for at least one supplemental content item (such as a show or a channel, etc.) that is not available as part of a subscription package, such as a basic or general subscription package, to subscribers of the first satellite service, but which is available on a subscription package basis, for example, as part of a basic or general subscription package, to subscribers of the second satellite service; and, in response to the order, providing the subscriber of the first satellite radio service with access to the supplemental content item on a receiver unit associated with the subscriber. The step of providing access to the supplemental content item may, for example, include configuring the receiver unit so that it will play the supplemental content item.

In one variation, the step of providing access to the supplemental content item includes providing the supplemental content item over the first satellite service's broadcast system to the receiver unit. In a subvariation, the receiver unit is a non-interoperable receiver unit with respect to the broadcast systems of the first and the second satellite services. In a different subvariation, the receiver unit is interoperable between the broadcast systems of the first and the second satellite services. In another variation of the embodiment, the receiver unit is interoperable between the broadcast systems of the first and the second satellite services, the subscription content of the first satellite service is provided over the first satellite service's broadcast system to the receiver unit, and the step of providing access to the supplemental content item via the receiver unit includes providing the item to the receiver unit via the second satellite service's broadcast system.

Any of the method embodiments and variations thereof can include a further step of charging a fee to the subscriber for receiving access to the supplemental content item. In one variation of embodiments in which the subscriber is charged a fee for the supplemental content item, each of the first service provider and the second service provider is accorded or credited a part of the fee.

Another embodiment provides a method for obtaining supplemental satellite radio content that includes the steps of: ordering at least one supplemental content item (such as a show or a channel, etc.) that is not available as part of a new or existing subscription package, for example, a basic or general subscription package, to a first satellite service by which subscription package content is received, but which is available as part of a subscription package, such as a basic or general subscription package, to subscribers of at least one other satellite service that serves at least part of the area served by the first satellite service provider; and, in response to the order, receiving access to the supplemental content item on a receiver unit on which the subscription content of the first satellite radio service is received.

In one variation, the step of receiving access to the supplemental content item includes receiving the supplemental content item over the first satellite service's broadcast system on the receiver unit. In a subvariation, the receiver unit is a non-interoperable receiver unit with respect to the broadcast systems of the first and the second satellite services. In a different subvariation, the receiver unit is interoperable between the broadcast systems of the first and the second satellite services. In another variation of the embodiment, the receiver unit is interoperable between the broadcast systems of the first and the second satellite services, the subscription content of the first satellite service is received over the first satellite service's broadcast system on the receiver unit, and the step of receiving access to the supplemental content item includes receiving the supplemental content item via the second satellite service's broadcast system on the receiver unit.

Still another embodiment provides a method for obtaining supplemental satellite radio content that includes the steps of: obtaining a subscription to a first satellite radio service that serves a desired area so that access to the subscription content of the first satellite radio service on a receiver unit is obtained; ordering at least one supplemental content item (such as a show or a channel, etc.) that is (i.) not included in the subscription content of the subscription to the first satellite radio service and/or (ii.) not available as part of a subscription, for example, not available as part of a basic or general subscription, to the first radio satellite service—but which is available on a subscription basis, for example, as part of a basic or general subscription, to subscribers of at least one other satellite radio service that serves at least part of the desired area; and, in response to the order, receiving access to the supplemental content item on the receiver unit.

In one variation, the step of receiving access to the supplemental content item includes receiving the supplemental content item over the first satellite service's broadcast system on the receiver unit. In a subvariation, the receiver unit is a non-interoperable receiver unit with respect to the broadcast systems of the first and the other satellite radio service. In a different subvariation, the receiver unit is interoperable between the broadcast systems of the first and the other satellite radio service. In another variation of the embodiment, the receiver unit is interoperable between the broadcast systems of the first and the other satellite service, the subscription content of the first satellite service provider is received over the first satellite service's broadcast system on the receiver unit, and the step of receiving access to the supplemental content item includes receiving the supplemental content item via the other satellite radio service's broadcast system on the receiver.

A further embodiment provides a method for obtaining supplemental satellite radio content that includes the steps of: obtaining a satellite radio receiver unit (an SDARS receiver unit); obtaining a subscription to a first satellite radio service that serves a desired area to receive access to the subscription content of the first satellite radio service on the receiver unit; ordering at least one supplemental content item (such as a show or a channel, etc.) that is (i.) not included in the subscription content of the subscription and/or (ii.) not available as part of a subscription, such as a basic or general subscription, to the first radio satellite service—but which is available as part of a subscription package, for example, a basic or general subscription package, to a second satellite radio service that serves at least part of the desired area; and in response to the order, receiving access to the supplemental content item on the receiver unit.

In one variation, the step of receiving access to the supplemental content item includes receiving the supplemental content item over the first satellite service's broadcast system on the receiver unit. In a subvariation, the receiver unit is a non-interoperable receiver unit with respect to the broadcast systems of the first and the second satellite services. In a different subvariation, the receiver unit is interoperable between the broadcast systems of the first and the second satellite services. In another variation of the embodiment, the receiver unit is interoperable between the broadcast systems of the first and the second satellite services, the subscription content of the first satellite service is received over the first satellite service's broadcast system on the receiver unit, and the step of receiving access to the supplemental content item includes receiving the supplemental content item via the second satellite service's broadcast system on the receiver.

Any of the method embodiments and their variations may further include a step of the subscriber paying an additional fee to receive access to the supplemental content item(s) over the fee paid for the subscription to the first satellite radio service.

Another embodiment provides a method for providing supplemental satellite radio content that includes the steps of: receiving an order from a new or preexisting subscriber to a first satellite service for at least one supplemental content item (such as a program or a channel, etc.) that is (i.) not included in the content of the subscription of the subscriber to the first satellite radio service and/or (ii.) at least not generally available as part of a subscription, such as a basic or general subscription, to subscribers of the first satellite service—but which is available as part of a subscription package, for example, a basic or general subscription package, to a second satellite radio service that serves at least part of the desired area, the subscriber being associated with a receiver unit over which the subscriber receives access to the subscription content of the first satellite service; and in response to the order, providing the supplemental content item via the receiver unit. The step of providing the supplemental content item may, for example, include configuring the receiver unit so that it will play the supplemental content item.

A further embodiment provides a satellite digital audio radio receiver unit that is configured to receive subscription content associated with a subscription to a first satellite radio service over a broadcast system of the first satellite radio service and configured to receive at least one supplemental content item not available as part of the subscription to the first satellite radio service, but which is available as part of a subscription, such as a basic or general subscription, to a second satellite radio service that serves an at least partially overlapping area as the first satellite radio service. The supplemental content item may, for example, be a subscriber-ordered and/or subscriber-selected supplemental content item.

In one variation, the receiver unit is configured to receive the supplemental content item over the broadcast system of the first satellite service provider. In a subvariation, the receiver unit is a dedicated receiver unit with respect to the broadcast system of the first satellite radio service. In a different subvariation, the receiver unit is an interoperable receiver unit with respect to the broadcast systems of the first and second satellite radio services.

Another embodiment provides a satellite digital audio radio receiver unit that (i.) is configured to receive subscription content associated with a subscription to a first satellite radio service over a broadcast system of the first satellite radio service and (ii.) is configured to receive at least one supplemental content item not available as part of the subscription to the first satellite radio service, wherein the content item not available as part of the subscription to the first satellite radio service is available as part of a subscription, such as a basic or general subscription, to a second satellite radio service that serves an at least partially overlapping area as the first satellite radio service, (iii.) is an interoperable receiver unit with respect to the broadcast systems of the first and second satellite radio services, (iv.) is configured to receive the at least one supplemental content item over the broadcast system of the second satellite radio service, and (v.) is not configured to receive a subscription package, such as a basic or general subscription package, of the second satellite service that includes the supplemental content item. The supplemental content item may, for example, be a subscriber-ordered and/or subscriber-selected supplemental content item.

In one variation, the receiver unit is not configured to receive any subscription package of the second satellite radio service. This refers to the state of configuration of the receiver unit and not necessarily to its ability to be configured to receive access to such a subscription package.

A further embodiment provides a satellite digital audio radio receiver unit that is configured to receive (i.) subscription content associated with a subscription to a first satellite radio service and (ii.) at least one supplemental content item not available as part the subscription to the first satellite radio service but which is available as part of a subscription package, such as a basic or general subscription package, to a second satellite radio service that serves an at least partially overlapping area as the first satellite radio service. The receiver unit is not configured to receive content of a subscription package of the second satellite radio service provider that includes the supplemental content item. The supplemental content item may, for example, be a subscriber-ordered and/or subscriber-selected supplemental content item. In one variation, the receiver unit is not configured to receive any subscription package of the second satellite radio service. This refers to the state of configuration of the receiver unit and not necessarily its ability to be configured to receive access to such a subscription package.

Still another embodiment provides a method for providing supplemental content items to a satellite radio service subscriber that includes configuring an SDARS receiver unit associated with the subscriber that is configured to receive a subscription to a first satellite radio service to also receive at least one supplemental content item that is (i.) not included in the content of the subscription of the subscriber to the first satellite radio service and/or (ii.) at least not generally available as part of a subscription, such as a basic or general subscription, to subscribers of the first satellite service—but which is available as part of a subscription package, for example, a basic or general subscription package, to a second satellite radio service that serves at least part of the same area as the first satellite radio service provider. In one variation of the embodiment, configuring the receiver unit is performed in response to an order for the supplemental content, for example, an order placed by the subscriber.

A further embodiment provides a method for providing supplemental content items to a satellite radio service subscriber that includes configuring a satellite digital audio receiver unit associated with a subscription package of a first satellite radio service (for a new or preexisting subscription) so that it receives: (i.) subscription content of the subscription package of the first satellite radio service; and (ii.) at least one supplemental content item that is (a.) not included in the content of the subscription package of the subscriber to the first satellite radio service and/or (b.) at least not generally available as part of a subscription, such as a basic or general subscription, to subscribers of the first satellite service—but which is available as part of a subscription package, for example, a basic or general subscription package, to a second satellite radio service that serves at least part, for example, at least a substantial part, of the area served by the first satellite radio service provider. In one variation, the receiver unit is already configured to receive the subscription content of the subscription package of the first satellite radio service and the step of configuring includes, or consists essentially of, configuring the receiver unit to receive the at least one supplemental content item described. In a different variation of the embodiment, the step of configuring includes configuring the receiver unit to receive the subscription content of the subscription package of the first satellite radio service and configuring the receiver unit to receive the at least one supplemental content item described.

A related embodiment provides a method for providing satellite radio content to an SDARS unit authorized to receive the content that includes the steps of: configuring an SDARS receiver unit to receive subscription content associated with a subscription, for example, a basic or general subscription, to a first satellite radio service; and configuring the SDARS receiver unit to receive at least one supplemental content item that is (i.) not included in the content of the subscription and/or (ii.) at least not generally available as part of a subscription, such as a basic or general subscription, to subscribers of the first satellite service—but which is available as part of a subscription package, for example, a basic or general subscription package, to a second satellite radio service that serves at least part of the area, for example, at least a substantial part of the area or at least substantially the same area, served by the first satellite radio service provider. In one variation of the embodiment, the step of configuring the receiver unit to receive the supplemental content is performed in response to an order placed for the supplemental content, for example, an order placed by the subscriber.

In the above embodiments, the steps of configuring an SDARS receiver unit to receive subscription content associated with a subscription and/or to receive at least one supplemental satellite radio content item may, for example, include providing the receiver unit with instructions that can be carried out by one or more processors of the receiver unit and/or providing the receiver unit with one or more necessary keys and/or algorithms for decryption of encrypted audio information. Satellite digital audio radio service receiver units that are configured according to any of the above embodiments or the variations thereof are also provided by the invention.

In any of the embodiments of the invention and the variations thereof, a supplemental content item may, for example, be a subscriber-ordered supplemental content item for which authorized access is provided (or will be provided) in response to an order placed by the subscriber or by a third-party, such as a gift-giver who orders the supplemental content item for the subscriber as a gift. In any of the embodiments of the invention and the variations thereof, a supplemental content item may, for example, be a subscriber-selected supplemental content item that is selected by the subscriber or by a third-party acting for the subscriber from a plurality of supplemental content items that can be ordered individually and/or in groups.

The periodicity and duration of providing access to supplemental content items and/or billing for the same can be the same as or similar to the regular subscription that is held by a subscriber who receives the supplemental content item(s) or it can be different. For example, if the supplemental content item is a channel or show that recurs with regularity, the supplemental content item could be provided and/or billed on a month-to-month basis that coincides with a month-to-month provision of and/or billing for a subscriber's regular subscription. In another scenario, the supplemental content item could be a one-time, non-recurring broadcast, such as a live concert broadcast, that is not included in the subscription content of a first satellite radio service, but which is included in a subscription to a second satellite radio service that serves at least part of the same area as the first service. In this case, a subscriber to the first service would order the supplemental content item and be billed for it, on a one-time, non-recurring basis.

It should be understood that the above embodiments and examples are meant to illustrate various aspects of the invention. Other embodiments and variations within the scope and spirit of the invention may be apparent to those of skill in the art upon reviewing this disclosure. Accordingly, the scope of the invention should be determined with reference to the claims, along with the full scope of equivalents to which such claims are entitled.

What is claimed is:

1. A method for providing supplemental satellite radio content, comprising the steps of:
    pursuant to the formation of an agreement between at least a first satellite radio service provider that provides a first satellite radio service and a second satellite radio service provider that provides a second satellite radio service that serves at least substantially the same area served by the first satellite service, wherein at least one content-item that is available as part of a subscription package to subscribers of the second satellite radio service provider but not generally available as part of a subscription package to the subscribers of the first service, is made available to subscribers of the first service on a supplemental basis at their option,
    receiving an order from a subscriber having a new or pre-existing subscription to the first satellite radio service whereby access to subscription content of the first satellite radio service is provided, the order being for at least one supplemental content item that is not generally available as part of a subscription to subscribers of the first satellite radio service, but which is available on a subscription package basis to subscribers the second satellite radio service that serves at least substantially the same area served by the first satellite radio service, the subscriber being associated with a satellite radio receiver unit authorized to access the subscription content of the subscription to the first satellite service; and in response to the order, providing access to the at least one supplemental content item via the receiver unit, wherein the receiver unit is a non-interoperable receiver unit with respect to the first and the second satellite radio services, wherein the step of providing access to the at least one supplemental content item comprises providing the supplemental content item to the receiver unit via a broadcast system of the first satellite radio service, and wherein the at least one supplemental content item comprises a plurality of supplemental content items that is orderable in a group and that comprises channels.

2. The method of claim 1, further comprising the step of:
charging a fee to the subscriber for providing access to the supplemental content item.

3. The method of claim 1, wherein the step of in response to the order, providing access to the at least one supplemental content item via the receiver unit comprises configuring the receiver unit in response to the order for the at least one supplemental content item.

4. A method for obtaining supplemental satellite radio content, comprising the steps of:

pursuant to the formation of an agreement between at least a first satellite radio service provider that provides a first satellite radio service and a second satellite radio service provider that provides a second satellite radio service that serves at least substantially the same area served by the first satellite service, wherein at least one content-item that is available as part of a subscription package to subscribers of the second satellite radio service provider but not generally available as part of a subscription package to the subscribers of the first service, is made available to subscribers of the first service on a supplemental basis at their option, ordering at least one supplemental content item that is not included in the content of a new or existing subscription package to the first satellite service by which subscription package content is received, but which is available as part of a subscription package to subscribers the second satellite service that serves at least substantially the same area served by the first satellite service; and in response to the order, receiving access to the at least one supplemental content item on a receiver unit on which the subscription package content of the first satellite radio service is received via a broadcast system of the first satellite radio service, wherein the receiver unit is a non-interoperable receiver unit with respect to the first and the second satellite services, and wherein the at least one supplemental content item comprises a plurality of supplemental content items that is orderable in a group and that comprises channels.

5. The method of claim 4, further comprising the step of:
the subscriber paying an additional fee to receive access to the at least one supplemental content item over a fee paid for the subscription to the first satellite radio service.

* * * * *